United States Patent [19]

Nakano et al.

[11] Patent Number: 5,124,183
[45] Date of Patent: Jun. 23, 1992

[54] INFORMATION RECORDING MEDIUM

[75] Inventors: Atsushi Nakano; Toshio Konno, both of Yokohama, Japan

[73] Assignee: Victor Company of Japan, Ltd., Yokohama, Japan

[21] Appl. No.: 542,213

[22] Filed: Jun. 22, 1990

[30] Foreign Application Priority Data

Jun. 23, 1989 [JP] Japan .................. 1-162096

[51] Int. Cl.[5] .............................. B32B 3/00
[52] U.S. Cl. .............................. 428/1; 428/64; 428/65; 428/913; 369/288; 346/76 L; 346/135.1; 430/945
[58] Field of Search .............. 428/1, 64, 65, 913; 369/288; 346/76 L, 135.1; 430/945

[56] References Cited

FOREIGN PATENT DOCUMENTS

58-125247 7/1983 Japan .

Primary Examiner—Patrick J. Ryan
Attorney, Agent, or Firm—Lowe, Price, LeBlanc & Becker

[57] ABSTRACT

An information recording medium comprising a laminated structure comprising;
a substrate and, provided thereon, a polymer-dispersed liquid crystal memory film comprising a polymer and dispersed therein a liquid crystal capable of rendering a liquid crystal phase at room temperature.

28 Claims, 8 Drawing Sheets

INFORMATION RECORDING MEDIUM

BACKGROUND OF THE INVENTION

1. Field of the Invention

This invention relates to an information recording medium.

2. Description of the Prior Art

With an increase in demands for the recording of a variety of information signals in a high recording density, information signals are in recent years recorded and reproduced in a higher density by the use of information recording mediums prepared on the basis of various principles of constitution or principles of operation. For example, there is an information recording medium in which information signals are recorded on a recording layer of the information recording medium by causing a physical change or chemical change corresponding with the information signals as a result of irradiation with a recording beam whose intensity has been modulated according to the information signals. Such an information recording medium includes an information recording medium belonging to a phase change type in which a material (an inorganic material or an organic material) having two or more stable structural states different in their optical and/or electrical characteristics (e.g., light transmittance, reflectance, absorbance, electrical resistance, and other characteristics) and capable of causing a transformation between the above stable structural states as a result of external application of optical, electrical or thermal energy is formed into a film on a substrate by vacuum deposition or sputtering. In respect of such an information recording medium, researches and development have been energetically made so that it can be put into practical use as an optical disk to which users can add records only once (a writing once recording disk) or an erasable optical disk as used in an office file memory and so forth. Proposals are also made on various types of recording mediums that are roughly grouped into a photomagnetic type, a pit formation type, and a bubble formation type. These are well known in the art. Recently, as an information recording medium capable of recording an information signal, targeted as a subject of recording, in the form of a charge image having a high resolution, a proposal is also made on a recording medium provided with a charge retension layer having the function of optical modulation.

In conventional many information recording mediums, however, the recording layer must be formed by vacuum deposition or sputtering, and hence there is the problem that a large-scale installation is required in the manufacture. In addition, there is another problem that information recording mediums endowed with desired characteristics can not be mass-produced with ease in a good yield. Other problems are also pointed out such that a recording material used for the constitution of a recording layer has toxicity and also the recording layer has a poor storage stability (weathering resistance). In respect of information recording mediums that utilize transformation between crystals of an alloy type, there is a disadvantage that they have a poor energy absorption efficiency and a low recording sensitivity. Furthermore, it is also questioned that information recording mediums in which a recording material of an organic type is used can not give good characteristics.

In the case when information recording mediums are used as OHP (overhead projection) sheets, conventional OHP sheets are well known to comprise a transparent resin sheet to which a toner is adhered by an electrophotographic process so that any desired information can be displayed. Such a toner used in development, however, can not be peeled and hence the display can not be rewritten. Accordingly, the sheet once having been used must be discarded. This has brought about a disadvantage of wastefulness, and it has been sought to provide an information recording medium usable as a rewritable OHP sheet.

Figure 13:
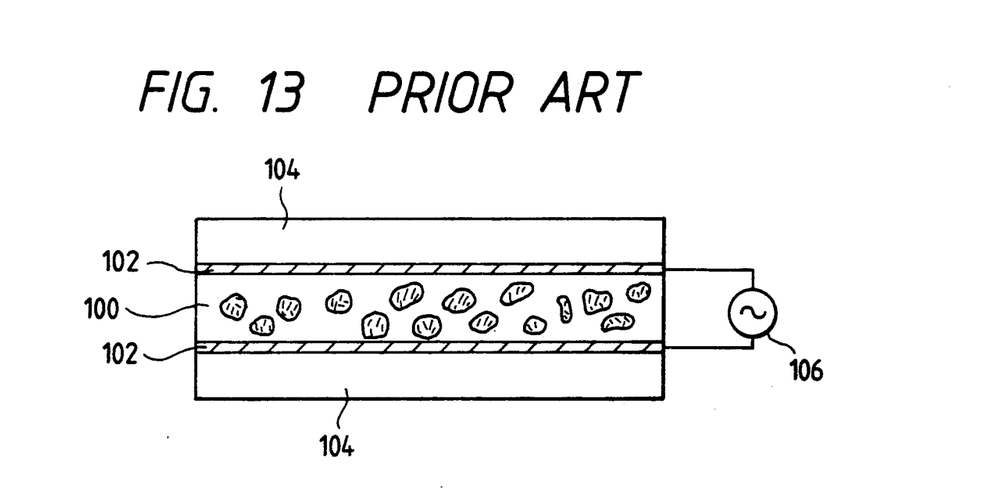
FIG. 13 illustrates a conventional information recording medium.

As an information recording medium that utilizes a polymer liquid crystal composite, Japanese Laid-open Patent Application No. 63-124024 discloses a liquid-crystal-dispersed light valve, in which, as shown in FIG. 13, a polymer-dispersed liquid crystal memory film 100 comprising a liquid crystal dispersed in a polymer binder is held between a pair of transparent electrode substrates 104 each having a transparent electrode 102, and an electrode 106 is connected between transparent electrodes 102.

In such a light valve, information can be written or read by a thermal means in the polymer-dispersed liquid crystal memory film 100, which is in a transparent state with aligned liquid crystals, e.g., by irradiation with a laser beam or using a thermal head. The information thus recorded can be erased by heating and cooling the polymer-dispersed liquid crystal memory film 100 while applying a voltage between the two transparent electrodes 102 through the electric source 106, so that the polymer-dispersed liquid crystal memory film 100 returns to the original transparent state.

Since, however, in such a conventional information recording medium the polymer-dispersed liquid crystal memory film 100 is held between the transparent electrode substrates 104, a transparent electrode substrates 104 is interposed between an information recording layer, i.e., the polymer-dispersed liquid crystal memory film 100, and a recording means. Hence, the heat from the recording means is diffused when transmitted to the polymer-dispersed liquid crystal memory film 100, resulting in a lowering of resolution of information records. Thus, it has been sought to provide an information recording medium that can attain a more improved resolution.

SUMMARY OF THE INVENTION

Accordingly, an object of the present invention is to solve the problems involved in the prior art.

The present invention provides an information recording medium comprising a laminated structure comprising a substrate and, provided thereon, a polymer-dispersed liquid crystal memory film comprising a polymer and dispersed therein a liquid crystal capable of rendering a liquid crystal phase at room temperature.

As preferred embodiments of the information recording medium, a first embodiment of the present invention is an information recording medium comprising a laminated structure comprising;

a substrate;

a polymer-dispersed liquid crystal memory film provided on said substrate, comprising a polymer and dispersed therein a liquid crystal having a melting point lower than the melting point of said polymer and capable of rendering a liquid crystal phase at room temperature, said liquid crystal being dispersed in the manner that the state of alignment produced as a result of the application of an electric field is retained after removal of the applied electric field;

a light-absorbing material layer having absorption characteristics in the wavelength region of recording light used in the recording of information, said layer being provided between said substrate and said polymer-dispersed liquid crystal memory film; and an electrode.

In another embodiment of the above first embodiment of the present invention, the light-absorbing material contained in the light-absorbing material layer may alternatively be dispersed in the polymer or in both the polymer and the liquid crystal without the light-absorbing material layer.

In a second embodiment of the present invention, the information recording medium comprises a laminated structure comprising;

a substrate;

a polymer-dispersed liquid crystal memory film provided on said substrate, comprising a polymer and dispersed therein a liquid crystal capable of rendering a liquid crystal phase at room temperature;

a protective film provided on said polymer-dispersed liquid crystal memory film; and an electrode serving as a low-resistivity layer.

In a third embodiment of the present invention, the information recording medium comprises;

a substrate;

a polymer-dispersed liquid crystal memory film comprising a polymer and a liquid crystal dispersed therein, one side of which is exposed to the air to serve as a surface to which heat is applied, and the other side of which is provided with said substrate; and an electrode provided on said substrate in contact with said polymer-dispersed liquid crystal memory film.

DESCRIPTION OF THE PREFERRED EMBODIMENTS

In the first place, the present invention is characterized in that the information recording medium has a polymer-dispersed liquid crystal memory film comprising a polymer and dispersed therein a liquid crystal capable of rendering a liquid crystal phase at room temperature. The liquid crystal capable of rendering a liquid crystal phase at room temperature (hereinafter often "room temperature liquid crystal") includes a nematic liquid crystal and a smectic liquid crystal.

Figure 6A:
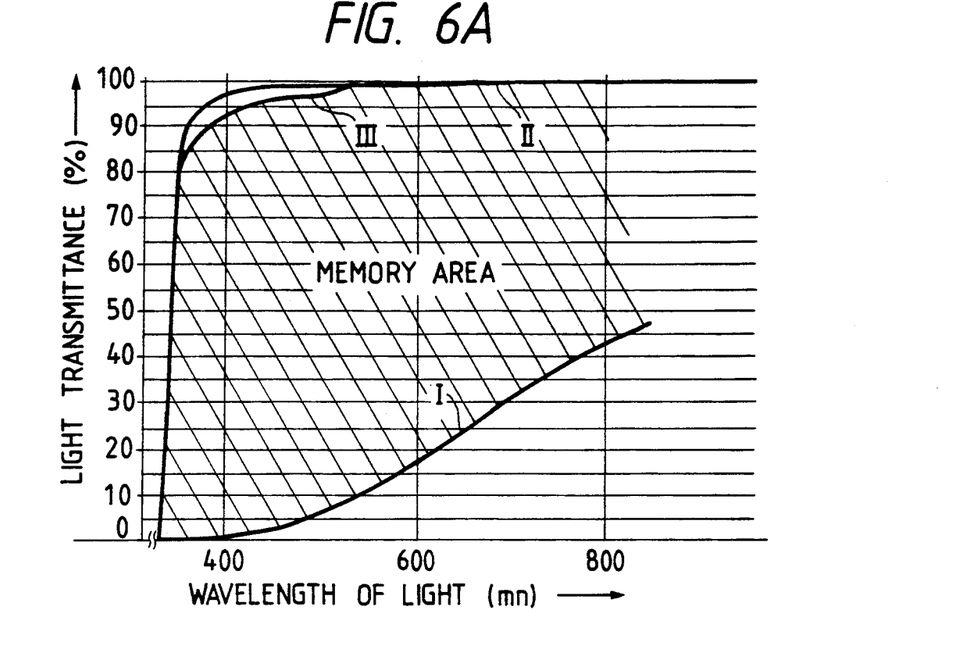
FIGS. 6A and 6B show curves of light transmittance of polymer-dispersed liquid crystal memory films that employ a smectic liquid crystal and a nematic crystal, respectively.
Figure 6B:
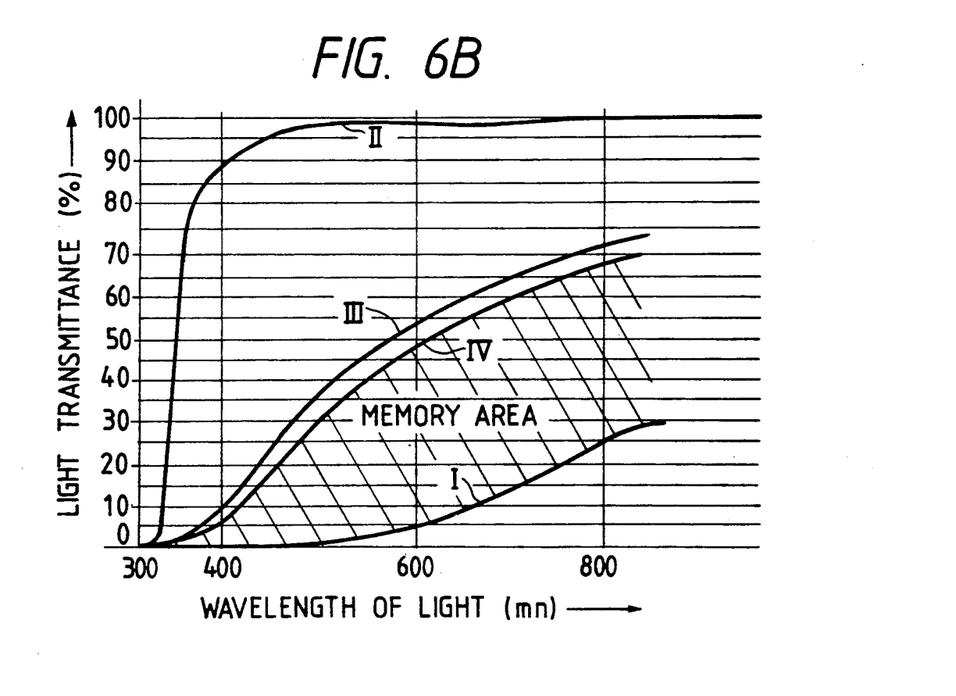

The smectic liquid crystal has much greater memory properties than the nematic liquid crystal. Since the smectic liquid crystal is highly viscous as compared with the nematic liquid crystal, a nematic liquid crystal which is more highly viscous among nematic liquid crystals is presumed to have higher memory properties. FIGS. 6A and 6B show curves of light transmittance of polymer-dispersed liquid crystal memory films that employ a smectic liquid crystal (#S6, available from BDH Co.) and a nematic crystal (E-44, available from BDH Co.), respectively. Curve I represents a transmittance observed immediately after the formation of a film; II, when the film is made transparent by corona discharging; III, when the film is left to stand for 90 minutes after charged; and IV (FIG. 6B), when charges are forcedly removed. In the case shown in FIG. 6A, the state of III remains unchanged even after charges have been removed.

In order for the information recording medium to have greater memory properties, the mutual action between the polymer and the liquid crystal should preferably be greater. Hence, the interface between a liquid crystal droplet dispersed and the polymer should preferably have a large area, in other words, liquid crystal droplets (i.e., pores in the polymer) may each should have a smaller size. The size should be preferably be from 0.1 μm to 0.5 μm in diameter. Even if no porous state is formed, the film may also have an amorphous form like a network structure.

As conditions for the polymer-dispersed liquid cyrstal memory film to have such a structure, achieve a sufficient contrast and have good film-forming properties, the liquid crystal and the polymer should be in a weight ratio ranging from 1/1 to 3/1. A ratio of less than 1/1 may not bring about the desired contrast, and a ratio more than 3/1 may result in poor film-forming properties.

FIRST EMBODIMENT

In a first embnodiment of the present invention, the information recording medium comprises a laminated structure comprising;

a substrate;

a polymer-dispersed liquid crystal memory film provided on said substrate, comprising a polymer and dispersed therein a liquid crystal having a melting point lower than the melting point of said polymer and capable of rendering a liquid crystal phase at room temperature, said liquid crystal being dispersed in the manner that the state of alignment produced as a result of the application of an electric field is retained after removal of the applied electric field;

a light-absorbing material layer having absorption characteristics in the wavelength region of recording light used in the recording of information, said layer being provided between said substrate and said polymer-dispersed liquid crystal memory film; and an electrode.

In another emboidment of the above first embodiment of the present invention, the information recording medium comprises a laminated structure comprising;

a substrate;

a polymer-dispersed liquid crystal memory film provided on said substrate, comprising a polymer and dispersed therein i) a liquid crystal having a melting point lower than the melting point of said polymer and capable of rendering a liquid crystal phase at room temperature, said liquid crystal being dispersed in the manner that the state of alignment produced as a result of the application of an electric field is retained after removal of the applied electric field, and ii) a light-absorbing material having absorption characteristics in the wavelength region of recording light used in the recording of information; and an electrode. The light-absorbing material dispersed in the polymer may alternatively be dispered in the liquid crystal, or in both the polymer and the liquid crystal.

In the first embodiment of the present invention, the recording medium is an optical recording medium in which information is recorded or written by heat generated as a result of the absorption of light.

Before information is recorded in the optical recording medium by the use of light, an electric field with a given and constant intensity is applied to an intended recording area of the optical recording medium so that the liquid crystal in the polymer-dispersed liquid crystal memory film at the intended recording area is aligned in a transparent state.

The above state of alignment is retained as it is, even after the applied electric field has been removed, and thus a recording medium is obtained which is in the state that the whole of the recording medium is kept transparent, in other words, the state that the recording medium has been pre-treated so that it can be recorded by light.

The optical recording medium in the above state is irradiated with recording light whose intensity has been modulated in accordance with the information to be recorded. As a result, the light-absorbing material present at the part irradiated with the recording light absorbs the recording light and the temperature rises up to a temperature between the melting point of the liquid crystal and the melting point of the polymer, so that the liquid crystal at that part is melted to give an isotrophic phase.

The part irradiated with the recording light moves through the recording area in the optical recording medium, and hence the liquid crystal having been made isotropic in a molten state is cooled with lapse of time to turn into a nematic phase, giving an opaque state at that part.

In the stage of from the above transparent state up to the opaque state, the optical recording medium can be in the state of multiple gradation as the intensity of the recording light changes multi-stepwise, and hence it is also possible to readily record and reproduce information by light in multiple gradation.

The first embodiment of the information recording medium of the present invention will be specifically described below in detail with reference to the accompanying drawings. FIGS. 1 to 4 are side views of respectively different examples of the information recording medium (an optical recording medium) of the present invention, and FIG. 5 illustrates the operation by which information is recorded, reproduced and erased in an information recording medium (an optical recording medium). FIGS. 6A and 6B show curves of light transmittance of polymer-dispersed liquid crystal memory films that employ a smectic liquid crystal and a nematic crystal, respectively.

In the optical recording mediums illustrated in FIGS. 1 to 4, the letter symbol BP denotes a substrate; E, an electrode (which may be, for example, a transparent electrode such as ITO film, or an electrode serving also as a light reflecting film such as an aluminum film); PLM, a polymer-dispersed liquid crystal memory film; the numeral 1, a polymer; and 2, a liquid crystal. The letter symbol IRL in FIG. 1 denotes a light-absorbing material layer, and the numeral 3 in FIGS. 2 and 4 denotes a particle of a light-absorbing material. The letter symbol Et in FIGS. 3 and 4 denotes a transparent electrode as exemplified by a transparent electrode comprised of an ITO film.

Any suitable polymeric materials may be used as materials for the substrate BP. In the case when the optical recording medium is constituted as a medium of a transmission type, a material transparent to read-out light is used in the substrate BP. In the case when the optical recording medium is constituted as a medium of a reflection type, in other words, when the optical recording medium is equipped with a dielectric mirror so that the read-out light can travel forward and back through the polymer-dispersed liquid crystal memory film, a material opaque to the read-out light may be used as the substrate BP.

The electrode E may be formed by forming a film by vacuum deposition, sputtering or the like on the substrate BP, using a suitable conductive material.

Figure 1:
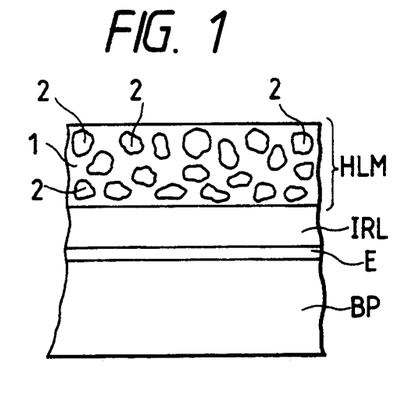
FIGS. 1 to 4 are side views of respectively different examples of the information recording medium according to the first embodiment of the present invention.
Figure 2:
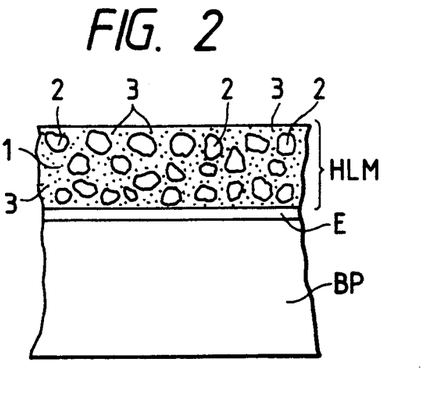
Figure 3:
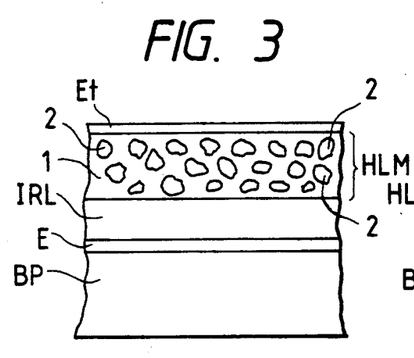

The optical recording medium shown in FIGS. 1 or 3 comprises the electrode E and provided thereon the light-absorbing material layer IRL and further thereon the polymer-dispersed liquid crystal memory film PLM. The optical recording medium shown in FIGS. 2 or 4 comprises the electrode E and provided thereon the polymer-dispersed liquid crystal memory film PLM in which the light-absorbing material is dispersed.

In the optical recording medium shown in FIGS. 1 or 3, the light-absorbing material layer IRL provided on the electrode E is comprised of a light-absorbing material having absorption characteristics in the wavelength region of recording light used in the recording of information. The light-absorbing material layer IRL may also be comprised of a material obtained by dispersing in a suitable binder a suitable dye having absorption characteristics in the wavelength region of recording light used in the recording of information.

In the case when the recording light has an absorption in the infrared region, an infrared absorption material as exemplified by a squalium dye may be used as the above light-absorbing material, which is dispersed in a suitable binder, and the resulting dispersion may be coated on the electrode E of the optical recording medium. The light-absorbing material layer IRL can be thus formed.

The polymer-dispersed liquid crystal memory film PLM is formed on the light-absorbing material layer IRL described above. The polymer-dispersed liquid crystal memory film PLM is comprised of a polymer having a volume resistivity of not less then $10^{14}$ Ω. cm and, dispersed therein, a nematic liquid crystal capable of rendering a liquid crystal phase at room temperature and has a volume resistivity of as high as not less than $1 \times 10^{13}$ Ω. cm. Such a polymer includes, for example, methacrylic resins, polyester resins, polycarbonate resins, vinyl chloride resins, polyamide resins, polyethylene resins, polypropylene resins, polystyrene resins, and silicone resins.

The polymer-dispersed liquid crystal liquid crystal memory film PLM used in the optical recording medium of the present invention shown in FIGS. 1 or 3 can be prepared and constituted according to the examples as described below.

EXAMPLE (1)

A room-temperature nematic liquid cyrstal LIXON5017 (or LIXON5028), a product of Chisso Corporation, is weighted in an amount of 3 g. The nematic liquid crystal LIXON5017 (or LIXON5028) thus weighed is added to a 10 wt. % chloroform solution of 20 g of PMMA, and the mixture is stirred and then left to stand.

Next, the chloroform solution of PMMA, containing the liquid crystal and having been left to stand as described above, is coated in a thickness of 8 microns using a bar coater on the light-absorbing material layer IRL. A polymer-dispersed liquid crystal memory film PLM is thus formed. Besides the PMMA, any polymers may be used as the polymer described above, so long as they dissolve in the solvent, can be coated into a film and has a high volume resistivity. In particular, polycarbonates, polyether imides, etc. can be preferably used (this applies to Example (2) described below).

EXAMPLE (2)

A room-temperature nematic liquid crystal ZLI4277, a product of Merck Japan Limited, is weighed in an amount of 3 g. The nematic liquid crystal ZLI4277 thus weighed is added to a 10 wt. % chloroform solution of 20 of PMMA, and the mixture is stirred and then left to stand.

Next, the chloroform solution of PMMA, containing the liquid crystal and having been left to stand as described above, is coated in a thickness of 8 microns using a bar coater on the light-absorbing material layer IRL. A polymer-dispersed liquid crystal memory film PLM is thus formed.

When the polymer-dispersed liquid crystal memory film PLM is formed on the light-absorbing material layer IRL in the manner as described above, the optical recording medium as shown in FIG. 1 can be obtained, which is comprised of the substrate BP and successively laminated thereon with the electrode E, the light-absorbing material layer IRL and the polymer-dispersed liquid crystal memory film PLM. The optical recording medium shown in FIG. 3 can be obtained when a transparent electrode Et (for example, an ITO film) is proved on the polymer-dispersed liquid crystal memory film PLM in the optical recording medium shown in FIG. 1.

The recording medium described above, as shown in FIGS. 1 or 3, has the constitution that the substrate BP, the electrode E, the light-absorbing material layer IRL and the polymer-dispersed liquid crystal memory film PLM are successively laminated. On the other hand, the optical recording medium as exemplified in FIGS. 2 or 4 is comprised of the substrate BP, the electrode E formed thereon, and laminated on the electrode E a polymer-dispersed liquid crystal memory film PLM so constituted as to have both the function of the light-absorbing material layer IRL and the function of the polymer-dispersed liquid crystal memory film PLM in the recording medium shown in FIGS. 1 or 3.

Figure 4:
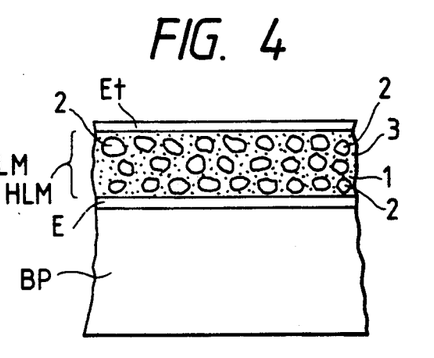
Figure 5:
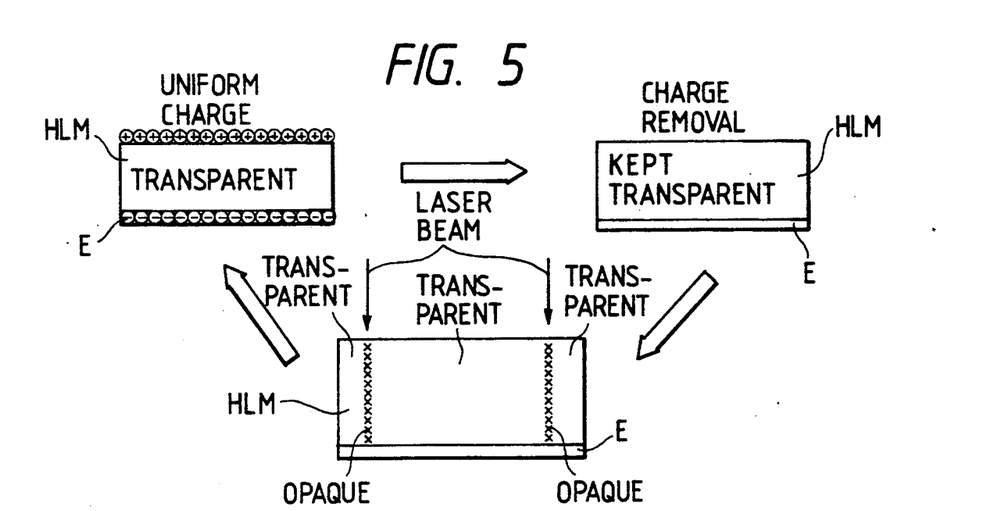
FIG. 5 illustrates the operation by which information is recorded, reproduced and erased in an information recording medium (an optical recording medium) according to the second embodiment of the present invention.

In the optical recording medium shown in FIGS. 2 or 4, the polymer-dispersed liquid crystal memory film PLM having the functions as described above, laminated on the electrode E provided on the substrate BP includes the following embodiments:

(A) A polymer-dispersed liquid crystal memory film PLM comprised of a polymer having a volume resistivity of not less than $10^{14}$ Ω. cm as exemplified by a methacrylic resin, a polyester resin, a polycarbonate resin, a vinyl chloride resin, a polyamide resin, a polyethylene resin, a polypropylene resin, a polystyrene resin or a silicone resin, and, dispersed therein, i) a nematic liquid crystal that renders a liquid crystal phase at room temperature and has a volume resistivity of not less than $1 \times 10^{13}$ Ω.cm and ii) fine particles of a light-absorbing material (e.g., a squalium dye) having absorption characteristics in the wavelength region of recording light used in the recording of information.

(B) A polymer-dispersed liquid crystal memory film PLM comprised of i) a polymer having a volume resistivity of not less than $10^{14}$ Ω.cm as exemplified by a methacrylic resin, a polyester resin, a polycarbonate resin, a vinyl chloride resin, a polyamide resin, a polyethylene resin, a polypropylene resin, a polystyrene resin or a silicone resin, ii) a nematic liquid crystal dispersed in the polymer, that renders a liquid crystal phase at room temperature and has a lower melting point than that of the above polymer and iii) fine particles, dispersed in the liquid crystal, of a light-absorbing material (e.g., a squalium dye) having absorption characteristics in the wavelength region of recording light used in the recording of information.

(C) A polymer-dispersed liquid crystal memory film PLM comprised of i) a polymer having a volume resistivity of not less than $10^{14}$ Ω.cm as exemplified by a methacrylic resin, a polyester resin, a polycarbonate resin, a vinyl chloride resin, a polyamide resin, a polyethylene resin, a polypropylene resin, a polystyrene resin or a silicone resin, ii) a nematic liquid crystal dispersed in the polymer, that renders a liquid crystal phase at room temperature and has a lower melting point than that of the above polymer and iii) fine particles, dispersed in both the polymer and the liquid crystal, of a light-absorbing material (e.g., a squalium dye) having absorption characteristics in the wavelength region or recording light used in the recording of information.

As an example for the preparation of the polymer-dispersed liquid crystal memory film PLM used in the optical recording medium constituted as shown in FIGS. 2 or 4, the polymer-dispersed liquid crystal memory film PLM according to the embodiment (C) described above can be prepared, for example, in the following manner:

A room-temperature nematic liquid crystal ZLI4277, a product of Merck Japan Limited, and PMMA are dissolved in chloroform in a weight ratio of 3:2 so as to give a solution of 8% by weight of PMMA. A squalium dye as an ultraviolet absorbing material is dissolved in the resulting solution in an amount of $1 \times 10^{-5}$ mol/l based on the chloroform, and a film is formed by spin coating by applying the solution to the surface of an electrode (e.g., an electrode comprised of an aluminum thin film) E formed by adhesion on the substrate BP. The polymer-dispersed liquid crystal memory film PLM is thus prepared in which the light-absorbing material is dispersed in both the polymer and the liquid crystal.

In the optical recording medium shown in FIG. 4, a transparent electrode (for example, an ITO film) Et is further formed by adhesion on the surface of the polymer-dispersed liquid crystal memory film thus formed.

In the optical recording medium according to the present invention, thus prepared, the liquid crystal used as a constituent of the polymer-dispersed liquid crystal memory film PLM renders a liquid crystal phase at room temperature in any of the embodiments. More specifically, the liquid crystal is not required to be heated for its alignment, and is enclosed in the state of a nematic phase in the innumerable minute pores formed in a randomly distributed state in a porous polymer film used as another constituent of the polymer-dispersed liquid crystal memory film PLM.

The innumerable minute pores in the polymer film are more preferable when they have a smaller diameter so that the optical recording medium can achieve high-density recording and reproducing. In a preferred embodiment, the pores may preferably have a diameter of not more than about 0.5 micron.

The recording of information signals in the optical recording medium of the present invention, the reproducing of the information signals recorded in the optical recording medium, and the erasing of the information signals recorded in the optical recording medium will be described below with reference to FIG. 5.

FIG. 5 illustrates the operation by which information is recorded, reproduced and erased in the optical recording medium of the present invention, using the optical recording medium having the constitution shown in FIG. 2. (The recording, reproducing and erasing in the optical recording medium shown in FIGS. 1, 3 or 4 can also be similarly carried out.)

The nematic liquid crystal enclosed in the respective innumerable minute pores formed in a randomly distributed state in the porous polymer film that constitutes the polymer-dispersed liquid crystal memory film PLM of the present invention is initially present in the state of a nematic phase, and hence the recording area in the optical recording medium is opaque so long as it is in that state.

Incidentally, in the optical recording medium of the present invention, its recording area is irradiated spotwise with light whose intensity has been modulated according to the information to be recorded, the liquid crystal at the part thus irradiated is melted by heat generated by the irradiation with light to give an isotrophic phase followed by cooling to give a nematic phase, and thus the information is recorded in the recording area of the optical recording medium. Hence, the whole recording area of the optical recording medium must be kept transparent before the recording is initiated.

In the optical recording medium of the present invention, the whole recording area initially in an opaque state is made transparent by the application of a voltage with a given intensity, to the recording area.

In FIG. 5, the illustration at the upper left with the indication "UNIFORM CHARGE" show the operation in which a voltage with a given intensity is applied to the whole recording area of the optical recording medium so that the nematic liquid crystals enclosed in the state of a nematic phase in the respective innumerable minute pores formed in a randomly distributed state in the porous polymer film that constitutes the polymer-dispersed liquid crystal memory film PLM is aligned in the direction of the electric field to make the whole recording area transparent.

An electric field with a given electric field intensity is applied to the polymer-dispersed liquid crystal memory film PLM in the following way: In the case when the optical recording medium has no electrode on the polymer-dispersed liquid crystal memory film PLM as in the embodiment shown in FIG. 1 or 2, an electric field with a given electric field intensity may be applied to the polymer-dispersed liquid crystal memory film PLM of the recording medium, using, for example, a corona charger. In the case when the optical recording medium is provided on the polymer-dispersed liquid crystal memory film PLM with the transparent electrode Et as in the embodiment shown in FIGS. 3 or 4, a given voltage may be applied to the electrode E and the transparent electrode Et of the optical recording medium so that the given voltage may be applied to the polymer-dispersed liquid crystal memory film PLM.

In the optical recording medium of the present invention, the state of alignment produced in the liquid crystal as a result of the application of an electric field so that the polymer-dispersed liquid crystal memory film PLM at the recording area of the optical recording medium may be made transparent is retained even after removal of the applied electric field. The reason why the state of alignment produced as a result of the application of an electric field as described above is kept retained is that the liquid crystal is enclosed in the innumerable minute pores formed in a randomly distributed state in the porous polymer film that constitutes the polymer-dispersed liquid crystal memory film PLM.

This will be more detailed below. The liquid crystal molecules enclosed in the pores are enclosed in the state of a nematic phase in the minute pores in which the force at the surface of a pore wall acts on the liquid crystal (when the force at the surface of a pore wall acts on the liquid crystal, the force more greatly acts on the liquid crystal present nearer to the pore wall, and hence the force at the surface of the pore wall, acting on the liquid crystal enclosed in the pore, has a greater influence as the diameter of the pore is smaller). In the case when an electric field with an electric field intensity more than a certain threshold value is applied to the liquid crystal enclosed in the pores in the state that the force at the surface of a pore wall acts on the liquid crystal as described above, the liquid crystal molecules enclosed in the pores in such a state and in a nematic state are so transformed as to be aligned in the direction of the electric field, against the force applied from the surface of the pore wall.

The liquid crystal molecules are transformed corresponding with the intensity of an electric field applied.

When the electric field applied to the liquid crystal is weak, they are transformed in such a tendency that only the liquid crystal molecules on which a weak force acts from the surface of the pore wall, i.e., the liquid crystal molecules present in the vicinity of the center of the pore are mainly aligned in the direction of the applied electric field. With an increase in the intensity of the electric field applied to the liquid crystal, the liquid crystal molecules are transformed in such a tendency that the liquid crystal molecules on which a strong force acts from the surface of the pore wall, i.e., the liquid crystal molecules present in the vicinity of the pore wall are also aligned in the direction of the applied electric field. The liquid crystal molecules are aligned in such a manner.

Since the liquid crystal molecules aligned in the above manner as a result of the application of an electric field are retained as they are, because of the force acting from the surface of the pore wall, the state of alignment of the liquid crystal, having been changed as a result of the application of an electric field is retained as it is, even after removal of the applied electric field. Thus, in the optical recording medium of the present invention, the liquid crystal in the polymer-dispersed liquid crystal memory film PLM at the recording area can be kept transparent when the liquid crystal molecules enclosed in a nematic state in the minute pores are aligned in the direction of the applied electric field before the recording is carried out.

In FIG. 5, the illustration at the upper right with the indication "CHARGE REMOVAL" shows the state that the whole polymer-dispersed liquid crystal memory film PLM at the recording area is kept transparent even when charges are removed after it has been made transparent.

In order to record information in the optical recording medium to which the post treatment as described above has been applied, the optical recording medium thus post-treated in an optically recordable state is irradiated with recording light (for example, a laser beam) whose intensity has been modulated according to the information to be recorded.

The illustration given at the lower part in FIG. 5 is a view to illustrate the state of recording. The light-absorbing material present at the part irradiated with the recording light indicated by "LASER BEAM" in FIG. 5 absorbs the recording light and the temperature rises up to a temperature between the melting point of the liquid crystal and the melting point of the polymer, so that the liquid crystal at that part is melted to give an isotropic phase.

The part irradiated with the recording light moves through the recording area in the optical recording medium, and hence the liquid crystal having been made isotropic in a molten state is cooled with lapse of time to turn into a nematic phase, giving an opaque state at that part.

In the stage of from the above transparent state up to the opaque state, the optical recording medium can be in the state of multiple gradation as the intensity of the recording light changes multi-stepwise, and hence it is also possible to readily record and reproduce information by light in multiple gradation.

From the optical recording medium in which the information has been recorded in an opaque state in the transparent recording area as described above, the recorded information can be simply reproduced (or read) by irradiating the information-recorded optical recording medium with reproducing light.

For example, the information-recorded optical recording medium is irradiated with the reproducing light and thereby the light transmitted through the information-recorded optical recording medium is converted into an electrical signal, using a photoelectric transducer. Thus the recorded information can be reproduced as an electrical signal. When the information is reproduced, the reproducing light can be made to have a large area so that a two-dimensional image sensor can be used as the photoelectric transducer. The reproducing light can be made to have a minute area so that the optical recording medium is scanned in a given scanning mode and imparted to the photoelectric transducer or the light reflected from the information-recorded optical recording medium as a result of irradiation with the reproducing light is fed to the photoelectric transducer, thereby obtaining and utilizing the information in the form of an electrical signal. The light transmitted through the information-recorded optical recording medium as a result of irradiation with the reproducing light or the light reflected from the information-recorded optical recording medium as a result of irradiation with the reproducing light can also be utilized as an optical information output.

In order to erase the information recorded in the optical recording medium, an electrical field with an intensity greater than the given intensity is applied to the information-recorded optical recording medium as shown in the upper left in FIG. 5 so that the liquid crystal enclosed in the innumerable minute poses formed in a randomly distributed state in the porous polymer film that constitutes the polymer-dispersed liquid crystal memory film PLM is aligned in the direction of the applied electric field, thereby making the whole recording area transparent.

In the case when a squalium dye is used as the light-absorbing material, a recorded image appears in the state that it changes between a transparent violet color and an opaque violet color. This, however, give no difficulties in the recording and reproducing.

SECOND EMBODIMENT

In the second embodiment of the present invention, the information recording medium comprises a laminated structure comprising;

a substrate;

a polymer-dispersed liquid crystal memory film provided on said substrate, comprising a polymer and dispersed therein a liquid crystal capable of rendering a liquid crystal phase at room temperature;

a protective film provided on said polymer-dispersed liquid crystal memory film; and an electrode serving as a low-resistivity layer.

The information recording medium according to the second embodiment of the present invention can be used as, for example, an OHP sheet used in an overhead projector (OHP).

Figure 7:
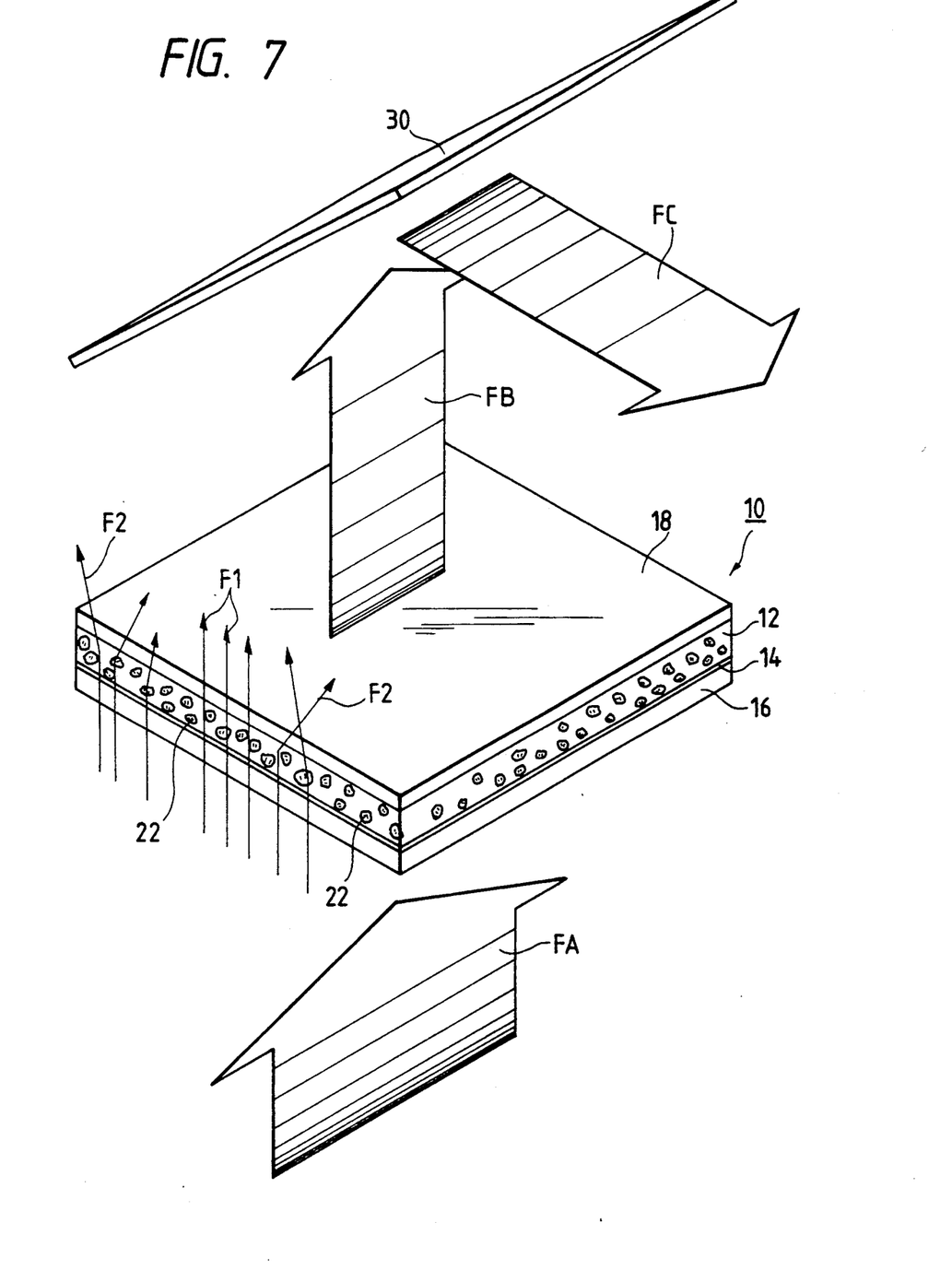
FIG. 7 illustrates the constitution of an example of the information recording medium (an OHP sheet) according to the second embodiment of the present invention.

The second embodiment of the present invention will be described below with reference to FIGS. 7 to 9. FIG. 7 illustrates the constitution of an example of the information recording medium (an OHP sheet) according to the present invention. FIGS. 8A to 8D illustrate a procedure according to which information is rewritten in the recording medium by electric-field recording and heat erasing. FIGS. 9A to 9D illustrate a procedure according to which the information is rewritten in the recording medium by heat recording and electric-field erasing.

FIG. 7 shows a transmission type OPH sheet. In FIG. 7, a sheet 10 is mainly comprised of a polymer-dispersed liquid crystal memory film 12. This polymer-dispersed liquid crystal memory film 12 is formed by coating on a substrate 16, interposing therebetween an electrode 14 serving as a low-resistivity layer. A protective layer 18 is formed on the surface of the polymer-dispersed liquid crystal memory film 12.

Of the above components, the polymer-dispersed liquid crystal memory film 12 comprises a polymer and dispersed therein a liquid crystal capable of rendering a liquid crystal phase at room temperature. The liquid crystal used therein includes a nematic liquid crystal, a smectic liquid crystal, and a mixture of a nematic liquid crystal and a cholesteric liquid crystal. The liquid crystals as previously described in the first embodiment of the present invention can be used in the recording medium according to the present embodiment. Preferred is a smectic liquid crystal capable of rendering a liquid crystal phase at room temperature, having a large refractive index anisotropy. The polymer may be any of those having no compatibility with the liquid crystal. The polymers as previously described in the first embodiment of the present invention can be used in the recording medium according to the present embodiment. Preferred are polymers having a high transparency, as exemplified by acrylc resins.

The low-resistivity layer 14 is formed of, for example, ITO commonly used as a transparent electrode. This is provided so that an electric field applied from the outside as described later can effectively act on liquid crystal droplets 22. As the substrate 16, a transparent material is used. The protective layer 18 is optionally provided taking account of impact resistance of the polymer-dispersed liquid crystal memory film 12, and is formed of a film with a high hardness.

In the case when a reflection type OHP is used, the substrate 16 is coated with, for example, an aluminum-deposited film having a high light-reflectance. Such an aluminum-deposited film can also serve as the low-resistivity layer 14.

In the OHP sheet thus constituted, information can be recorded and erased in the following manner.

A. ELECTRIC-FIELD RECORDING//HEAT ERASING

Figure 8A:
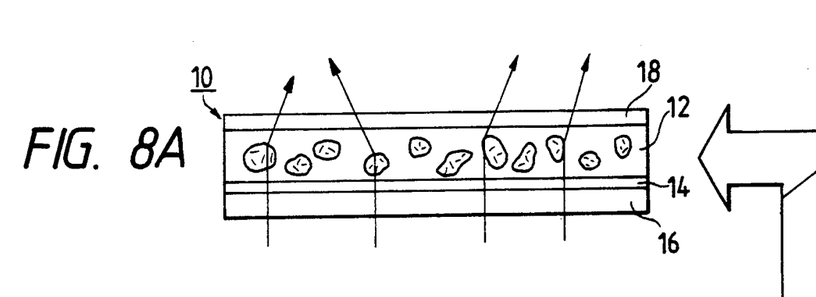
FIGS. 8A and 8D illustrate a procedure according to which information is rewritten in the recording medium shown in FIG. 7, by electric-field recording and heat erasing.

First, a procedure of recording information by the application of an electric field and erasing the information by the application of heat will be described with reference to FIGS. 8A to 8D. In the first place, as shown in FIG. 8A, the sheet 10 is in a light-scattering state before recording. In other words, the liquid crystal molecules of liquid crystal droplets 22 in the polymer-dispersed liquid crystal memory film 12 are aligned in a random state.

Information is recorded in the sheet 10 by applying an electric field, using corona discharge or a line electrode. In this recording, no heating is required since the room temperature liquid crystal material is used. Once an electric field whose intensity has been modulated according to the information to be recorded is applied, the liquid crystal molecules of liquid crystal droplets 22a at the part to which the electric field has been applied is aligned in the direction of the electric field as shown, for example, in FIG. 8B, corresponding with the electric-field intensity. On the other hand, the light transmittance increases corresponding with the degree of alignment, and hence the liquid crystal turns into a state in which the light modulation corresponding with the information intended to be recorded takes place.

The sheet 10 in this state is set on an OHP (not shown) as well known, and, as shown in FIG. 7, illuminated by means of a light source (not shown) as shown by arrow FA. Of this illuminating light, the light made incident on the part of liquid crystal droplets 22a at which the information has been recorded is transmitted as it is, as shown by arrow F1, and the light made incident at other part is scattered as shown by arrow F2 (see FIG. 7 and FIG. 8C).

The transmitted light is made incident on a mirror means 30 as shown in arrow FB, reflected therefrom, and then projected on a screen (not shown) as shown by arrow FC. Since, as described above, the light is transmitted through the part sheet 10 at which the information has been written, the contents of recorded information are displayed in bright relief against a dark background.

The sheet 10 in which the information has been thus recorded is heated with a heater 32 to a temperature higher than the smectic-nematic transition point or smectic-isotropic transition point of the liquid crystal. As a result, the alignment of liquid crystal molecules is brought into a random state again, and thus the recorded information is erased. The sheet 10 from which the information has been erased is in the state that the incident light scatters therein, and hence it becomes possible to carry out recording again as shown by arrow FD.

B. HEAT RECORDING/ELECTRIC-FIELD ERASING

Figure 9A:
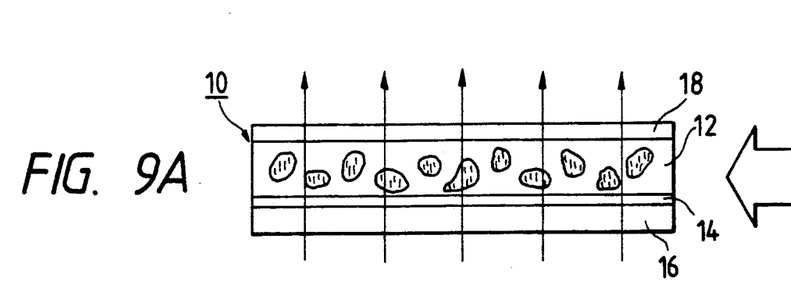
FIGS. 9A to 9D illustrate a procedure according to which the information is rewritten in the recording medium shown in FIG. 7, by heat recording and electric-field erasing.

Next, a procedure of recording information by the application of heat and erasing the information by the application of an electric field will be described with reference to FIGS. 9A to 9D. In the first place, as shown in FIG. 9A, the sheet 10 is previously brought into a transparent state before recording, using an erasing process as described later. In other words, the liquid crystal molecules of liquid crystal droplets 22 in the polymer-dispersed liquid crystal memory film 12 are aligned in a unidirectionally arranged state.

Information is recorded in the sheet 10 by applying heat, using a heat recording head 34 as exemplified by a heat transfer head or a thermal head. Once a heat whose intensity has been modulated according to the information to be recorded is applied, the liquid crystal molecules of liquid crystal droplets 22b at the part to which the heat has been applied is aligned at random as shown, for example, in FIG. 9B, corresponding with the intensity of the heat. On the other hand, the light transmittance decreases corresponding with the degree of alignment, and hence the liquid crystal turns into a state in which the light modulation corresponding with the information intended to be recorded takes place.

The sheet 10 in this state is set on an OHP (not shown) as in the case of the electric-field recording described above, and the recorded information is projected. In this instance, since the light is scattered at the part of sheet 10 at which the information has been written (see FIG. 9C), the contents of recorded information are displayed in dark relief against a bright background.

Figure 9B:
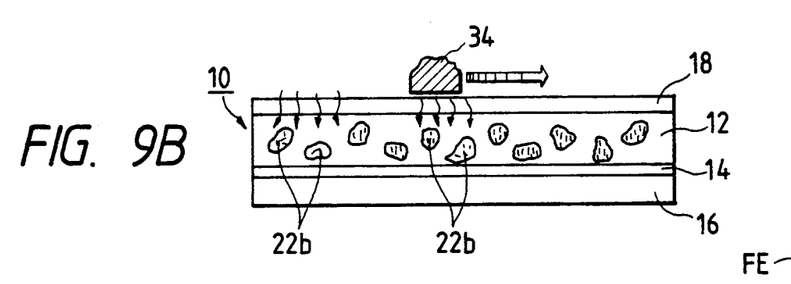
Figure 9C:
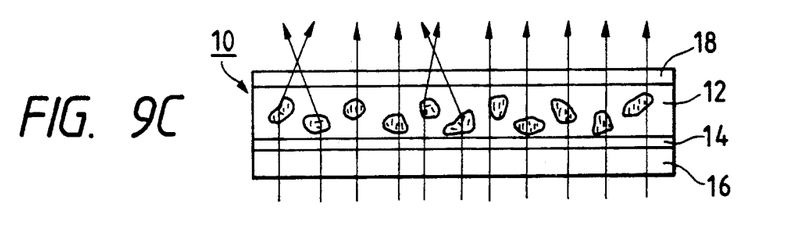
Figure 9D:
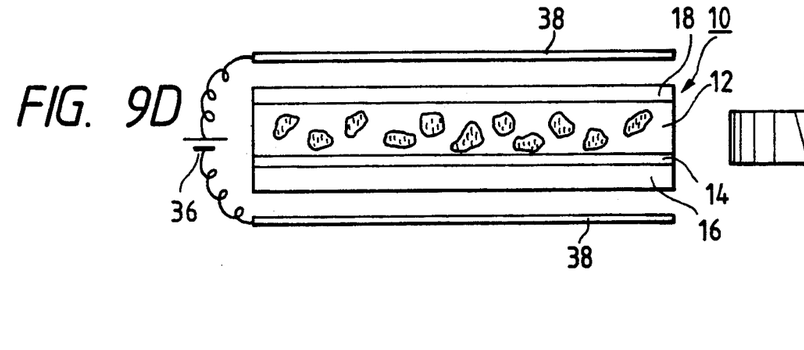

To the sheet 10 in which the information has been thus recorded, a strong electric field is applied through an appropriate electric source 36 and a corona wire 38.

In this instance, no heating is required since the room temperature liquid crystal material is used. As a result, the state of liquid crystal molecules is brought random again, and thus the recorded information is erased. The sheet 10 from which the information has been erased is in the state that the incident light is transmitted therethrough. Hence, the sheet 10 is brought into the state shown in FIG. 9A as shown by arrow FE, and it becomes possible to carry out recording again.

EXPERIMENT

An experiment carried out on the information recording medium according to the present embodiment will be described below. This experiment is concerned with an example in which the heat recording/electric-field erasing as shown in FIG. 3 is applied. First, in a 15% by weight chloroform solution containing 5 g of PMMA (polymethyl methacrylate), 10 g of a room temperature smectic liquid crystal (S6, a product of BDH Co. ) was mixed to prepare a solution. The resulting solution was applied to a polyester film provided with a transparent electrode, by bar coating to give a coating thickness of about 10 μm, followed by drying. A sheet was thus formed. No portective film was formed.

Next, to the sheet thus prepared, a strong electric field was applied through a corona wire as shown in FIG. 9D to make the whole sheet transparent. Then, the sheet was set on a heat transfer printer and the desired printing was carried out using a heat transfer head as shown in FIG. 9B. Subsequently, the resulting sheet was set on an OHP so that scale-up projection was performed. As a result, it was possible to obtain a projected image with a sufficient contrast. A strong electric field was further applied to this sheet. As a result, the recorded information was erased and the sheet was brought into an original state. Thus it was possible to carry out recording again.

The second embodiment of the present invention is by no means limited to the above embodiment. For example, the low-resistivity layer 14 is provided in the above embodiment so that the applied electrode can effectively act on the liquid crystal droplets 22 when the information is erased by the application of an electric field (see FIG. 9D). This layer, however, may not necessarily be provided. In principle, the information can be recorded or erased by the application of an electric field even when no low-resistivity layer is provided.

Figure 8B:
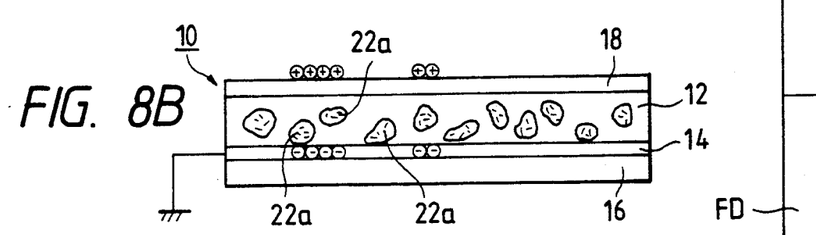
Figure 8C:
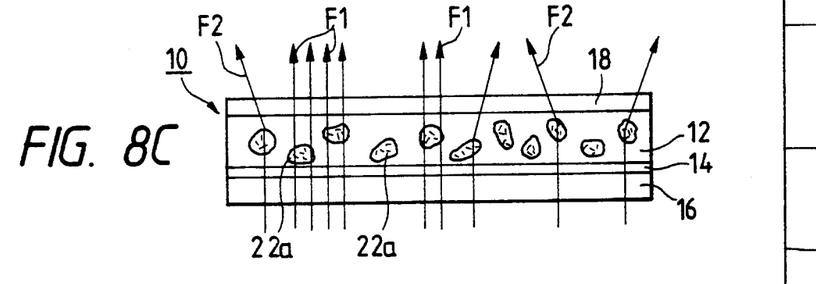
Figure 8D:
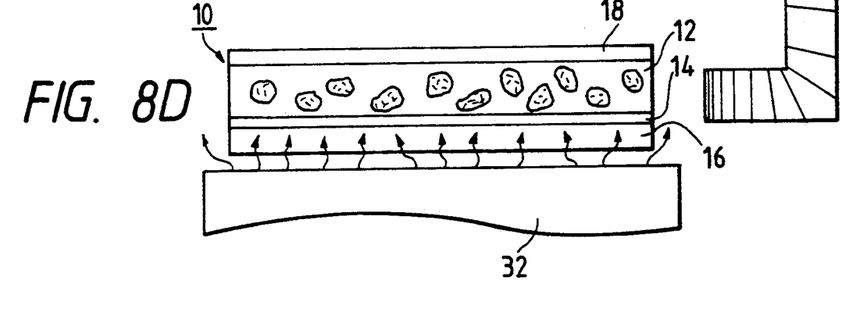

As another embodiment of the second embodiment of the present invention, the electric-field erasing shown in FIG. 9D may also be carried out on the sheet on which the electric-field recording shown in FIG. 8B has been carried out. Conversely, the heat erasing shown in FIG. 8D may also be carried out on the sheet on which the heat recording shown in FIG. 9B has been carried out.

In addition, the means of changing liquid crystal alignment as exemplified by the means of applying heat or the means of applying an electric field may not be limited to the above embodiments, and any means can be used so long as the information can be recorded and erased.

The above second embodiment of the present invention is mainly applied in OHP sheets of a transmission type. It, however, can also be applied in OHP sheets of a reflection type.

THIRD EMBODIMENT

In the third embodiment of the present invention, the information recording medium comprises;

a substrate;

a polymer-dispersed liquid crystal memory film comprising a polymer and a liquid crystal dispersed therein, one side of which is exposed to the air to serve as a surface to which heat is applied, and the other side of which is provided with said substrate; and an electrode provided on said substrate in contact with said polymer-dispersed liquid crystal memory film.

The above surface to the heated (heating surface) may preferably be provided with a protective layer.

According to this third embodiment of the present invention, which is useful as a thermal recording medium, a thermal head can be used in direct contact with the heating surface of the polymer-dispersed liquid crystal memory film, and hence the heat can be transmitted in a good state without diffusion.

In the ermbodiment in which the protective layer is formed on the heating surface, the memory film surface can be made to be broken with difficulty.

Figure 10:
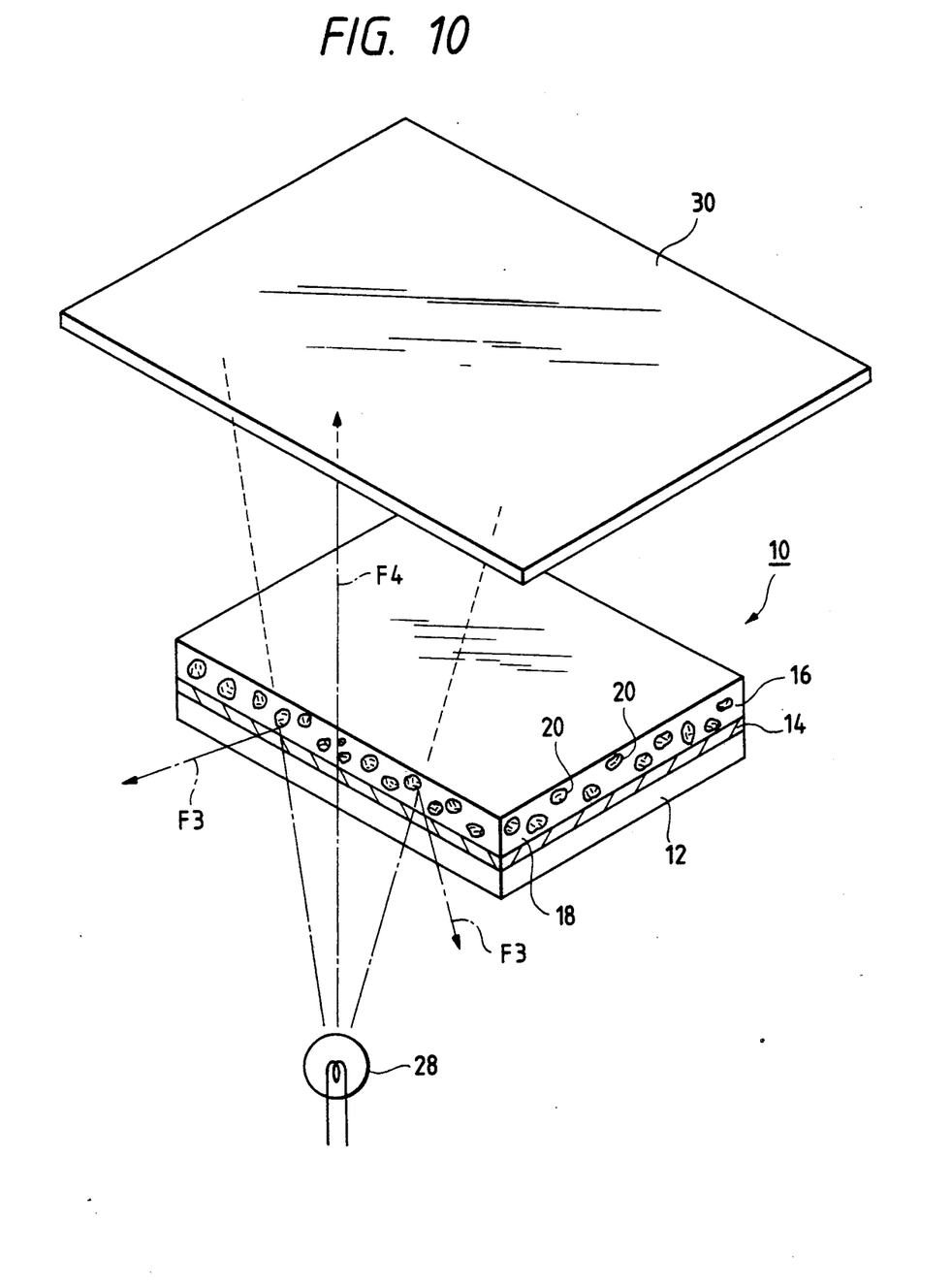
FIG. 10 illustrates the constitution of an example of the information recording medium according to the third embodiment of the present invention.
Figure 11A:
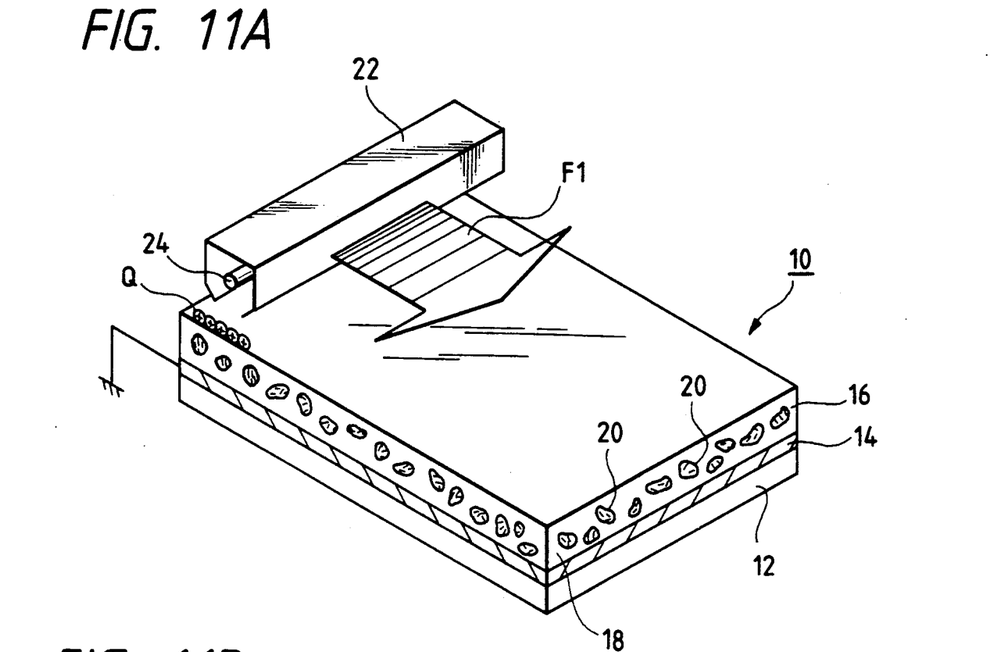
FIGS. 11A and 11B illustrate a procedure of recording and erasing information in the recording medium shown in FIG. 10.
Figure 11B:
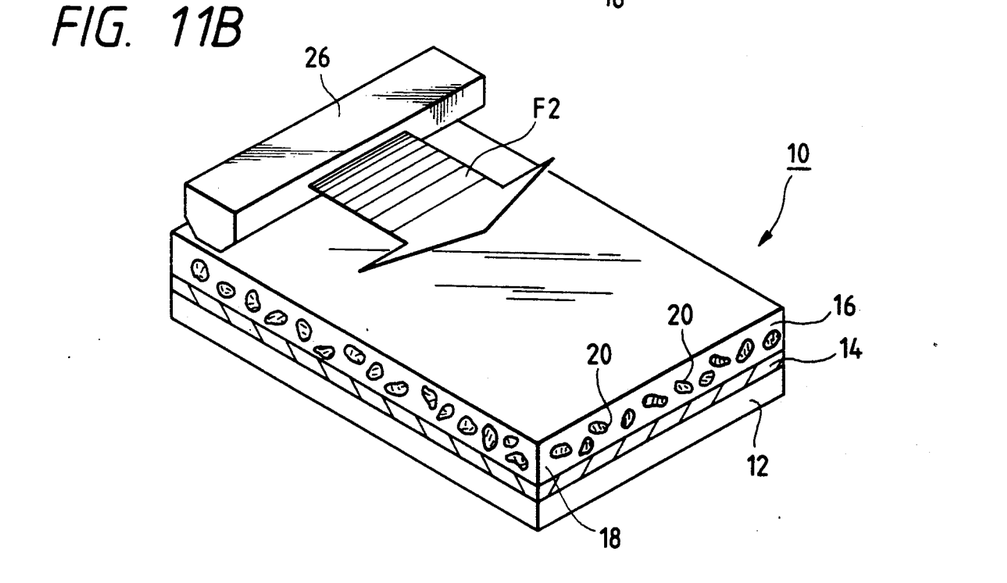
Figure 12:
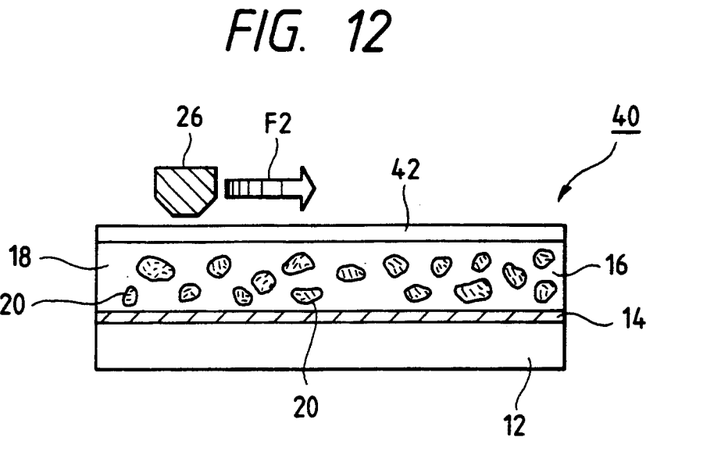
FIG. 12 illustrates another example of the information recording medium according to the third embodiment of the present invention.

The third embodiment of the present invention will be described below in detail with reference to FIGS. 10 to 13. FIG. 10 illustrates the constitution of an example of the information recording medium according to the present embodiment. FIGS. 11A and 11B illustrate a procedure of recording and erasing information in the recording medium shown in FIG. 10. FIG. 12 illustrates another example of the information recording medium according to the present embodiment.

EXAMPLE 1

Example 1 of the third embodiment of the present invention will be first described with reference to FIG. 10. This example is a transmission type recording medium in which information is read by transmission of illuminating light.

In FIG. 10, an information recording medium 10 is comprised of a substrate 12 and laminated thereon a polymer-dispersed liquid crystal memory film 16 interposing a transparent electrode 14 between them. The polymer-dispersed liquid crystal memory film 16 is comprised of a polymer matrix 18 and a large number of liquid crystal droplets 20 dispersed therein.

Such an information recording medium 10 can be prepared, for example, in the following way: Using a polyester film as the substrate 12, an appropriate transparent electrode 14 is formed by vacuum deposition or the like. On the other hand, as the liquid crystal for the polymer-dispersed liquid crystal memory film 16, the liquid crystals described in relation to the first embodiment of the present invention can be used. Preferred are smectic liquid crystals S5 and S6, available from BDH Co. As the polymer used for dispersing the liquid crystal therein, the polymer described in relation to the first embodiment of the present invention can be used. Preferred are PMMA (polymethyl methacrylate), acrylic photocurable resins, polyether imide, and polyacrylate. Since the polymer-dispersed liquid crystal memory film 16 is made transparent by corona discharging as will be described later, the polymer may preferably have a higher chargeability and also may pteferably have a good transparency in view of transmission of light. Thus, PMMA is used as more preferable material. Such a polymer-dispersed liquid crystal memory film 16 can be formed on the polyester film by coating.

Next, operation of the recording medium of Example 1 will be described with reference to FIGS. 11A and 11B. Firstly, the whole of the information recording medium 10 is made transparent as shown in FIG. 11A.

As shown therein, a discharge head 22 is moved in the direction of arrow F1 in the state that the transparent electrode 14 is earthed. Here, discharge occurs from the discharge wire and thus charges Q are stored on the surface of the polymer-dispersed liquid crystal memory film 16.

As a result an electric field in a given direction is applied to the polymer-dispersed liquid crystal memory film 16, so that liquid crystal molecules are aligned, for example, in the direction of the electric field. Then, light is transmitted through the polymer-dispersed liquid crystal memory film 16 and the whole information recording medium 10 is brought transparent. At this time, the charges Q stored at the back of the polymer-dispersed liquid crystal memory film 16 decay with time because of, e.g., the moisture content in the air. Even if the charges remain there, they do not affect the subsequent process. If necessary, the charges may be removed by the application of alternating current corona discharge. Even after the charges have been removed, the alignment of liquid crystal molecules is retained.

The reason therefor is that the liquid crystal molecules are greatly affected by the pore walls in the polymer, and thus so to speak kept captured therein. The mutual action between the liquid crystal molecules and polymer molecules is affected by the mutual action between liquid crystal molecules and also by the viscosity of the liquid crystal. Hence, a liquid crystal material having a higher viscosity and therefore capable of giving a great mutual action with the polymer should be selected so that large memory characteristics (hysteresis characteristics) can be obtained.

Next, information is thermally recorded in the information recording medium 10 by means of a thermal head 26 that is moved in the direction of arrow F2 as shown in FIG. 11B. The heat that corresponds with the contents of the information to be recorded is applied by the thermal head 26 to the corresponding part of the polymer-dispersed liquid crystal memory film 16. As a result, the alignment of molecules of the liquid crystal droplets 20 is made random corresponding with the degree of the heat applied, and the incident light becomes scattered.

Here, in the present embodiment, the information is recorded by bringing the thermal head 26 into direct contact with the polymer-dispersed liquid crystal memory film 16, so that the applied heat is well transmitted to the liquid crystal droplets 20 in the polymer-dispersed liquid crystal memory film 16.

Next, the information recording medium 10 in which the information has been thus recorded is irradiated with illuminating light from an appropriate light source 28 as shown, for example, in FIG. 10. Of this illuminating light, the light made incident on the part of the polymer-dispersed liquid crystal memory film 16 at which the information has been recorded is scattered since the liquid crystal molecules are in a random state (see arrow F3). On the other hand, the light made incident on the part at which no information is recorded is transmitted as it is, since the liquid crystal molecules are aligned there (see arrow F4).

Thus, the illuminating light is modulated in the polymer-dispersed liquid crystal memory film 16, corresponding with the recorded information, and then projected on a screen 30. As a result, the information recorded in the information recording medium 10 is displayed on the screen 30.

The information recording medium 10 can be erased by applying an electric field through the corona charging shown in FIG. 11A, so that the information recording medium is made again transparent.

In this way, according to Example 1 of the present embodiment, the heat is directly applied to the polymer-dispersed liquid crystal memory film 16 by means of the thermal head 26, and hence it becomes possible to obtain a good resolution without diffusion of the heat. In addition, the transparent electrode may be provided only on one side of the polymer-dispersed liquid crystal memory film 16, and hence the recording medium can be made more cost-advantageous than the conventional.

EXAMPLE 2

Example 2 of the third embodiment of the present invention will be described below with reference to FIG. 12. In example 1 described above, the recording thermal head 26 is brought into direct contact with the poly-dispersed liquid crystal memory film 16. Hence, in some instances, such contact with the thermal head may bring about a break of the surface of the poly-dispersed liquid crystal memory film 16. In the Example 2, an improvement is made in view of this problem. The same reference numerals will be used here in respect of the constituent parts same with or corresponding to those in Example 1.

As shown in FIG. 12, a protective layer 42 is formed on the polymer-dispersed liquid crystal memory film 16 of an information recording medium 49. This protective layer 42 may be formed of an ultraviolet-curable resin, or an inorganic nitride or inorganic oxide such as SiN, $SiO_2$, $TiO_2$ or $V_2O_5$ which are transparent. The utraviolet-curable resin may include any resins having a hardness high enough to endure the mechanical impact of the thermal head 26. Such a protective layer 42 can lessen the possibility of a break of the surface of the polymer-dispersed liquid crystal memory film 16.

The information recording medium 40 as described above can be prepared, for example, in the following way: To give the polymer-dispersed liquid crystal memory film 16, a smectic liquid crystal S6, a product of BDH Co., and PMMA are mixed in a weight ratio of 1:1. A solution is prepared using chloroform as a solvent. The resulting solution is coated on a polyester film fitted with a transparent electrode, by bar coating to give a coating thickness of about 10 $\mu$m. After the coating is well dried, a polyphosphagen solution, produced by Idemitsu Petrochemical Co., Ltd., is coated thereon by far coating, followed by irradiation with ultraviolet rays to give a coating thickness of about 1 $\mu$m after ultraviolet curing. The protective layer 42 is thus formed.

Thus polyphosphagen does not react with the liquid crystal, and hence can form the protective layer 42 without destruction of the polymer-dispersed liquid crystal memory film 16. The protective layer 42 can be formed with a coating thickness of from about 0.1 to about 10 $\mu$m, and should preferably be not more than 1 $\mu$m so that a decrease in resolution, due to the diffusion of heat at the time of heat recording, can be well suppressed.

Information was erased and recorded in the information recording medium 40 as shown in FIGS. 11A and 11B. As a result, it was possible to record information with substantially the same resolution as in the information recording medium of Example 1, without causing a break of the polymer-dispersed liquid crystal memory film 16 because of the impact from the thermal head 26.

Another method for preparing the information recording medium of the present embodiment will be described below. First, the polymer-dispersed liquid crystal memory film 16 is formed in the same manner as above to have a coating thickness of about 10 μm. Next, a SiO$_2$ film with a thickness of about 5,000 Å is formed thereon as the protective layer 42 by ion-assist vacuum deposition. Information was recorded using the thermal head also in this instance. As a result, no break occurred in the poly-dispersed liquid crystal memory film 16.

In this way, in Example 2, a protective layer is provided on the polymer-dispersed liquid crystal memory film, and hence the durability can be improved.

The third embodiment of the present invention is by no means limited to the above examples. For example, although both the above examples are concerned with a transmission type, the present embodiment can also be applied in a recording medium of a reflection type in which the light made incident on the polymer-dispersed liquid crystal memory film 16 is reflected on a reflection film provided on the substrate side thereof.

The thermal head may also be of the type the heat can be simultaneously applied for one line, or of the type the heat is applied while a thermal head is scanned in the primary and secondary directions.

What is claimed is;

1. An information recording medium comprising a laminated structure comprising;
   a substrate and, provided thereon, a polymer-dispersed liquid crystal memory film comprising a polymer having a volume resistivity of not less than $10^{14}$ Ω.cm and further having dispersed therein a room temperature pheumatic liquid crystal capable of providing a liquid crystal phase at room temperature, wherein said liquid crystal and said polymer are present in a weight ratio of from 1/1 to 3/1.

2. A charge image recording medium according to claim 1, wherein said polymer is selected from the group consisting of a methacrylic resin, a polyester resin, a polycarbonate resin, a vinyl chloride resin, a polyamide resin, a polyethylene resin, a polypropylene resin, a polystyrene resin, and a silicone resin.

3. An information recording medium according to claim 1, wherein said liquid crystal dispersed in the polymer has a volume resistivity of not less than $1 \times 10^{13}$ Ω.cm.

4. An information recording medium according to claim 1, wherein said liquid crystal dispersed in the polymer is selected from the group consisting of a nematic liquid crystal, a smectic liquid crystal, and a mixture of nematic liquid crystal and a cholesteric liquid crystal.

5. An information recording medium according to claim 1, wherein said polymer is polymethyl methacrylate and said liquid crystal is a nematic liquid crystal.

6. An information recording medium according to claim 1, whrein said polymer is polymethyl methacrylate and said liquid crystal is a smectic liquid crystal.

7. An information recording medium according to caleim 1, wherein said polymer-dispersed liquid crystal memory film is a polymer-dispersed liquid crystal memory film comprising a polymer and dispersed therein a liquid crystal having a melting point lower than the melting point of said polymer and capable of rendering a liquid crystal phase at room temperature, said liquid crystal being dispersed in the manner that the state of alignment produced as a result of the application of an electric field is retained after removal of the applied electric field;
   a light-absorbing material layer having absorption characteristics in the wavelength region of recording light used in the recordinf of information is provided between said substrate and said polymer-dispersed liquid crystal memory film; and
   an electrode is provided between said substrate and said light-abrosbing material layer.

8. A charge image recording medium according to claim, wherein said polymer is selected from the group consisting of a methacrylic resin, a polyester resin, a polycarbonate resin, a vinyl chloride resin, a polyamide resin, polyethylene resin , a polypropylene resin, a polystyrene resin, and a silicone resin.

9. An information recording medium according to claim 7, wherein said liquid crystal dispersed in the polymer has a volume resistivity of not less than $1 \times 10^{13}$ Ω.cm.

10. An information recording medium according to claim 7, wherein said liquid crystal dispersed in the polymer is selected form the group consisting of a nematic liquid crystal , smectic liquid crystal ,and a mixture of nematic liquid crystal and a cholesteric liquid crystal.

11. An information recording medium according to claim 7, wherein said polymer is polymethyl methacrylate and said liquid crystal is a nematic liquid crystal.

12. An information recording medium according to claim 7, wherein said polymer is polymethyl methacrylate and said liquid crystal is a smectic liquid crystal.

13. An informaton recording medium according to claim 1, wherein said polymer-dispersed liquid crystal memory film is a polymer-dispersed liquid crystal memory film comprising a polymer and dispersed therein i) a liquid crystal having a melting point lower than the melting point of said polymer and capable of rendering a liquid crystal phase at room temperature, said liquid crystal being dispersed in the manner that the state of alignment produced as a result of the application of an electric field is retained after removal of the applied electric field, and ii) a light-absorbing material having absorption characteristics in the wavelength region of recording light used in the recording of information; and
   an electrode is provided between said substrate and said polymer-dispersed liquid crystal memory film.

14. A charge image recording medium according to claim 13, wherein said polymer is selected from the group consisting of a methacrylic resin, a polyester resin, a polycarbonante resin, a vinyl chloride resin, a polyamide resin, a polyethylene resin, a polypropylene resin, a polystryrene resin, and a silicone resin.

15. An information recording medium according to claim 13, wherein said liquid crystal dispersed in the polymer has a volume resistivity of not less than $1 \times 10^{13}$ Ω. cm.

16. An information recording medium according to claim 13, wherein said liquid crystal dispersed in the polymer is selected from the group consisting of a nematic liquid crystal, a smectic liquid crystal, and a mixture of nematic liquid crystal and a cholesteric liquid crystal.

17. An information recording medium according to claim 13, wherein said polymer is polymethyl methacrylate and said liquid crystal is a nematic liquid crystal.

18. An information recording medium acccording to claim 13. wherein said polymer is polymethyl methacrylate and said liquid crystal is a smectic liquid crystal.

19. An information recording medium according to claim 13. wherein said light-absorbing material is further dispersed in said liquid crystal dispersed in the polymer.

20. An information recording medium according to claim 1, which further comprises:
   a protectiove film provided on said polymer-dispersed liquid crystal memory film; and
   an electrode service as a low-resistivity layer.

21. An information recording medium according to claim 20. wherein the information is recorded in said recording medium by the application of an electric field and is erased by the application of heat.

22. An information recording medium according to claim 20, wherein the information is recorded in said recording medium by the application of heat and is erased by the application of an electric field.

23. An information recording medium comprising;
   a substrate;
   a polymer-dispersed liquid crystal memory film comprising a polymer having a volume resistivity of not less than $10^{14}\Omega.cm$ and a room temperature pneumatic liquid crystal dispersed therein, wherein said liquid crystal and said polymr are present in a weight ratio of from 1/1 to 3/1, one side of said memory film being exposed to the air to serve as a surface to which heat is applied, and the other side of which is provided with said substrate; and
   an electrode provided on said substrate in contact with said polymer-dispersed liquid crystal memory film.

24. A charge image recording medium according to claim 23, wherein said polymer is selected from the group consisting of a methacrylic resin, a polyester resin, a polycarbonate resin, a vinyl chloride resin, a polyamide resin, a plyethylene resin, a polypropylene resin, a polystyrene resin, and a silicone resin.

25. An information recording medium according to claim 13, wherein said liquid crystal dispersed in the polymer is selected from the group consisting of a nematic liquid crystal, a smectic liquid crystal, and a mixture of nematic liquid crystal and a cholesteric liquid crystal.

26. An information recording medium according to claim 23, wherein said polymer is polymethyl methacrylate and said liquid crystal is a nematic liquid crystal.

27. An information recording medium according to claim 23, wherein said polymer is polymethyl methacrylate and said liquid crystal is a smectic liquid crystal.

28. An information recording medium according to claim 13, which further comprises a protective layer provided on said polymer-dispersed liquid crystal memory film.

* * * * *